April 8, 1958  L. COUILLARD  2,830,181
ELECTRONIC REGULATOR FOR FOLLOW-UP SERVOSYSTEMS
Filed June 10, 1954

United States Patent Office 2,830,181
Patented Apr. 8, 1958

2,830,181

ELECTRONIC REGULATOR FOR FOLLOW-UP SERVOSYSTEMS

Louis Couillard, Paris, France, assignor to Societe Francaise Radio-Electrique, a corporation of France Application June 10, 1954, Serial No. 435,899

Claims priority, application France June 18, 1953

7 Claims. (Cl. 250—36)

The present invention relates to electronic follow-up servosystems. Such systems, which are in very common use, are essentially adapted to maintain at a constant level a physical quantity, such as a voltage, a frequency, etc. As soon as the value of this physical quantity departs from a given level, this departure is manifested by an error signal; generally this error signal is not used as such, but is applied to an amplifier at the output of which a correction signal is provided. The latter is used in bringing the physical magnitude in question back to the required level. This amplifier fulfills therefore the function of a regulator.

Amplifiers used for this purpose are often direct current amplifiers. Now, as it is well known, such amplifiers have many drawbacks and are delicate in use.

The present invention is intended to eliminate the disadvantages inherent in the use of direct current amplifiers as follow-up regulators.

It is an object of the invention to provide an electronic follow-up regulator, adapted to be used with follow-up servosystems of the above-mentioned type without making use of direct current amplifiers. The regulator according to the invention comprises an oscillator tube, means for applying to the control grid of this tube the error signal produced by the controlled device, and a rectifier connected across the oscillating circuit for providing the correcting voltage.

According to a further feature of the invention, for preventing any hunting in the action of the regulator, there is applied to the grid of the oscillator tube, in opposition to the error voltage, a voltage equal to the derivative with respect to time of the correcting voltage. To this end, the correcting voltage produced by the oscillator is applied to a differentiating circuit whose output voltage is applied to the grid of the oscillator in opposition to the error voltage.

Other features and advantages of the invention will be apparent from the ensuing description which is given merely by way of example.

In the accompanying drawing.

Figure 1:
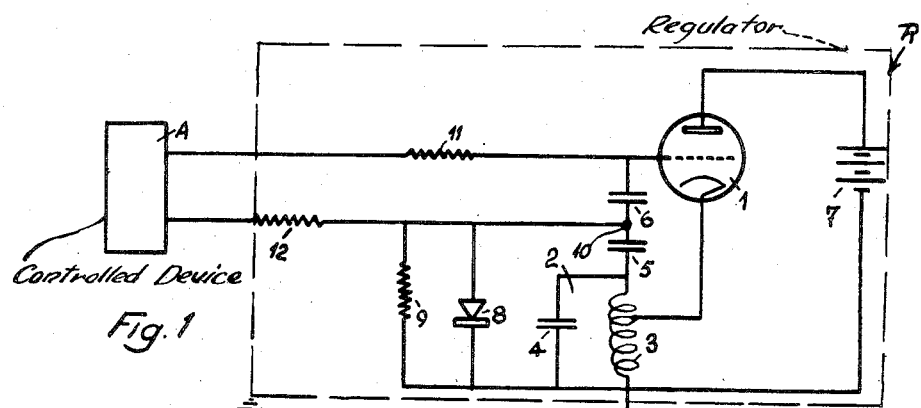
Fig. 1 is a diagrammatic view of a follow-up regulator according to the invention.

According to the embodiment shown in Fig. 1, a regulator R embodying the invention is used with a controlled device A. This device furnishes an error voltage to the regulator R and receives from the latter a correcting voltage each time the physical quantity which should be kept at a constant level departs therefrom. The regulator R comprises an oscillator tube, for instance a triode 1. The oscillating circuit 2 of the oscillator comprises an induction coil 3 and a capacitor 4. One of the ends of the oscillating circuit 2 is connected to earth and the other to the grid of the tube 1, through two capacitors 5 and 6 connected in series. The triode 1 is fed by a supply source 7. A rectifier 8 and a resistor 9 are shunt connected between the point 10, common to the tube capacitors 5 and 6, and earth.

The error voltage furnished by the controlled device A is applied, through a resistor 11, to the grid of the tube 1. The rectified voltage from the rectifier 8 is applied to the controlled device A through a resistor 12, or through another high frequency uncoupling device.

The devices A and R are so arranged that the voltage normally furnished to the grid of the tube 1, i. e. when the physical quantity, which is to be kept constant, remains constant and consequently when there is no error signal, is the voltage necessary for sustaining the oscillations in the oscillating circuit 2. For any value of the voltage, applied to the grid of the oscillator 1, exceeding $U_0$, the amplitude of the oscillations, of which the circuit 2 is the seat, is increasing with time and for any voltage less than $U_0$, the amplitude of the existing oscillations decrease as a function of time until they finally stop. For the voltage $U_0$, the oscillations maintain a constant amplitude.

Thus, each time the physical quantity concerned is at the desired level, the voltage applied to the grid of the tube 1 is equal to $U_0$.

It will be observed that the circuit formed by the resistor 11 and the capacitor 6 constitutes a differentiating circuit for the correcting voltage supplied by the rectifier 8. The voltage supplied by this circuit is opposed to that supplied to the grid of the tube 1 by the resistor 11. Under these conditions, the derivative of the correcting voltage with respect to time is at all times subtracted from the error voltage applied to the oscillator grid. This tends to prevent too sudden variations in the correcting voltage and generally any hunting which may result from such variations.

Figure 2:
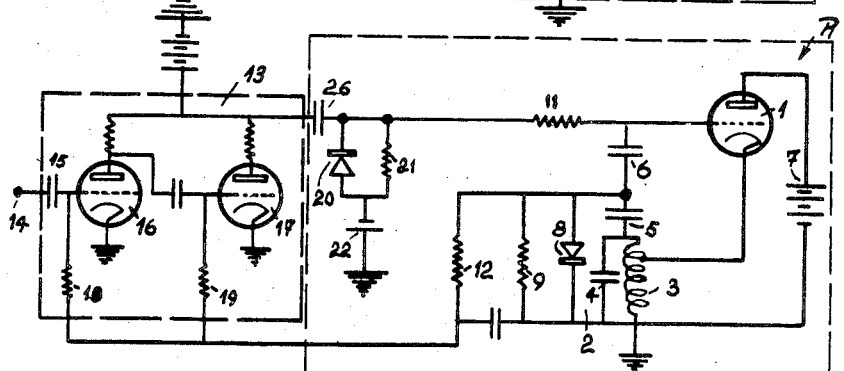
Fig. 2 is a diagrammatic view of a variable gain amplifier whose gain is controlled by the regulator shown in Fig. 1.

In the diagram shown in Fig. 2, the follow-up regulator embodying the invention is used as a gain regulator for maintaining at a constant level the output voltage of a variable gain amplifier.

According to this mode of carrying out the invention, an amplifier 13 receives at 14 through a capacitor 15 an input voltage $U_1$ and supplies through a capacitor 26 an output voltage $U_2$. The amplifier 13, which is shown very diagrammatically, comprises, for example, two stages 16 and 17. Each of the latter includes a variable —mu tube whose gain may be controlled by the continuous voltage applied through resistors 18 and 19 respectively.

The part of the diagram of Fig. 2 described above corresponds to the device A shown in Fig. 1. The rest of the diagram shows a regulating device entirely similar to the regulator R shown in Fig. 1. Like elements are designated by like reference numerals in both cases.

The output voltage $U_2$ of the amplifier is applied to a rectifier 20 shunted by a resistor 21.

The rectifier 20 and the resistor 21 are connected to the negative terminal of a direct current source 22 whose other terminal is connected to earth. This voltage constitutes a reference voltage.

The operation of the unit shown in Fig. 2 is as follows:

When no signal is applied to the input of the amplifier 13, the grid of the tube 1 is negatively biased by the supply source 22. The grids of the tube 16 and 17 of the amplifier receive under these conditions no voltage from the regulator R. The amplifier 13 is thus regulated for a maximum gain.

When a signal of sufficient amplitude is applied to the amplifier, the output voltage supplies, after rectification, a direct voltage having a polarity opposite to that supplied by the supply source 22. The algebraic sum V of these two voltages is applied to the grid of the tube 1 through the resistance 11.

The reference voltage provided by the source 22 has such a value that this sum is equal to $U_0$. If the output voltage of the amplifier increases so that V becomes greater than $U_0$, say equal to $U_0+\Delta U_0$, i. e. when an error signal $\Delta U_0$ is produced, the amplitude of the oscillations of tube 1 increases with time. The oscillation, rectified by the rectifier 8, supplies a negative correcting voltage which is applied to the grids of the tubes 16 and 17 of the amplifier 13 whose gain is thereby reduced. The output voltage of the amplifier decreases and in consequence the error voltage decreases. When the error voltage is zero or, in other words, when the voltage applied to the grid of the tube 1 is again equal to $U_0$, the oscillations retain the amplitude they had at this instant and their amplitude is again constant.

The correcting voltage has the value necessary for maintaining the gain of the amplifier at the desired value.

The same thing occurs in the opposite direction when the input voltage $U_1$ of the amplifier 13, and hence the voltage applied to the grid of the tube 1, decreases. As soon as the voltage of the grid is less than $U_0$, the amplitude of the oscillations, and hence that of the rectified voltage decrease with time until the gain becomes sufficient for the voltage applied to the grid to become once more equal $U_0$.

Thus it can be seen that the voltage of the grid of the tube 1, and hence the output voltage of the amplifier, are constant whatever the input voltage.

The presence will also be observed in the diagram shown in Fig. 2 of the differentiating circuit the function of which has been explained in the example shown in Fig. 1.

Figure 3:
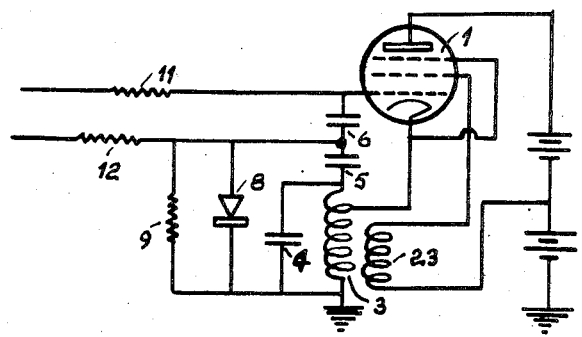
Fig. 3 shows a modification of the follow-up regulator embodying the invention.

Fig. 3 shows the regulator of Fig. 2, Fig. 1, in which a pentode tube oscillator is used. In this modification, the grid screen of the tube 1 is fed through a coil 23, the direction of the coil winding and the number of coils being such that the potential difference at the frequency of the oscillator is zero between the cathode and the grid screen of the tube.

The invention is of course not limited to the details of construction hereinbefore described and illustrated which have been given merely by way of example.

What I claim is:

1. A follow-up servo-system comprising: a controlled device, of the type capable of producing a direct current error voltage each time a given physical quantity departs from a given level and of restoring this quantity to this level upon reception of a direct current corrector voltage; and a regulator device, consisting essentially of a constant frequency oscillator; means for applying to said oscillator a constant control voltage, for causing the same to produce oscillations of current having uniform amplitude, when said quantity is at said level; means for superimposing on said constant control voltage, said error voltage for varying the amplitude of said oscillations; and means for rectifying said current of said oscillations for providing said corrector voltage.

2. A follow-up regulator, for a servo-system of the type capable of producing a direct current error voltage each time a given physical quantity departs from a given level and of restoring this quantity to this level upon reception of a direct current corrector voltage, said regulator comprising; a constant frequency oscillator; means for applying to said oscillator a constant control voltage, for causing the same to oscillate with uniform amplitude, when said quantity is at said level; means for superimposing on said control voltage said error voltage for varying the amplitude of said oscillations and means for rectifying said oscillations for providing said corrector voltage.

3. A follow-up servo-system comprising: a controlled device, of the type capable of producing a direct current error voltage each time a given physical quantity departs from a given level and of restoring this quantity to this level upon reception of a direct current corrector voltage; a constant frequency oscillator; means for applying to said oscillator a constant control voltage, for causing the same to oscillate with uniform amplitude, when said quantity is at said level; means for superimposing on said constant control voltage said error voltage for varying the amplitude of said oscillations; means for rectifying said oscillations for providing said corrector voltage; a differentiating circuit for differentiating said corrector voltage; and means for applying said differentiated corrector voltage to said oscillator in opposition with said error voltage.

4. A follow-up regulator, for a servo-system of the type capable of producing a direct current error voltage each time a given physical quantity departs from a given level and of restoring this quantity to this level upon reception of a direct current corrector voltage, said regulator comprising: a constant frequency oscillator having a control grid on which said error voltage is applied; means for rectifying the oscillations provided by said oscillator for providing said corrector voltage; a differentiating circuit for differentiating said corrector voltage; and means for applying said differentiated voltage to said oscillator in opposition with, said error voltage.

5. A follow-up regulator, for a servo-system of the type capable of producing a direct current error voltage each time a given physical quantity departs from a given level and capable of restoring this quantity to this level upon reception of a direct current corrector voltage, said regulator comprising: an electronic tube oscillator having a grid; means for biasing said grid for putting said tube in uniform amplitude oscillation condition when said quantity is at said level; means for applying said error voltage to said grid for varying said oscillation amplitude; and means for rectifying the current corresponding to said oscillation for providing said corrector voltage.

6. A follow-up regulator, for a servo-system of the type capable of producing a direct current error voltage each time a given physical quantity departs from a given level and capable of restoring this quantity to this level upon reception of a direct current corrector voltage, said regulator comprising: an electronic tube oscillator having a grid; means for biasing said grid for putting said tube in uniform amplitude oscillation condition when said quantity is at said level; means for applying said error voltage to said grid; means for rectifying the signal provided by said oscillator for providing said corrector voltage, a differentiating circuit for differentiating said corrector voltage; and means for applying the differentiated corrector voltage to said grid in opposition with said error voltage.

7. A gain regulator for varying the gain of a variable gain amplifier of the type having an input for feeding thereto a first voltage and an output for collecting thereat, a second voltage, means responsive to a corrector voltage, for varying said gain, thereby automatically to keep said output voltage at a constant level, said regulator comprising: an oscillator tube having a grid; a direct current voltage source; the magnitude of said direct current voltage being such that the algebraic sum of said direct current voltage and of said constant level voltage, when rectified, is equal to the oscillation threshold grid voltage of said oscillator, means for applying said sum as a biasing voltage to said grid; means for rectifying the signal provided by said oscillator for providing said corrector voltage; a differentiating circuit for differentiating said corrector voltage; and means for applying the differentiated corrector voltage to said grid in opposition with said error voltage.

References Cited in the file of this patent

UNITED STATES PATENTS

| | | |
|---|---|---|
| 2,103,619 | Hallmark | Dec. 28, 1937 |
| 2,508,321 | Wilmotte | May 16, 1950 |
| 2,583,837 | Hadfield | Jan. 29, 1952 |
| 2,609,510 | Wilmotte | Sept. 2, 1952 |
| 2,728,858 | Ziffer | Dec. 27, 1955 |